United States Patent [19]

Igarashi

[11] Patent Number: 5,198,931

[45] Date of Patent: Mar. 30, 1993

[54] OBJECTIVE OPTICAL SYSTEM FOR ENDOSCOPES

[75] Inventor: Tsutomu Igarashi, Tokyo, Japan

[73] Assignee: Olympus Optical Co., Ltd., Tokyo, Japan

[21] Appl. No.: 792,156

[22] Filed: Nov. 14, 1991

Related U.S. Application Data

[62] Division of Ser. No. 510,661, Apr. 18, 1990, Pat. No. 5,087,989.

[30] Foreign Application Priority Data

Apr. 19, 1989 [JP] Japan ................. 1-097600

[51] Int. Cl.$^5$ .................. G02B 21/02; G02B 13/18; G02B 9/60; G02B 9/34
[52] U.S. Cl. .................. 359/660; 359/659; 359/714; 359/715; 359/770; 359/783
[58] Field of Search ............. 359/783, 784, 659, 660, 359/661, 714, 715, 716, 770

[56] References Cited

U.S. PATENT DOCUMENTS

| 4,403,837 | 9/1983 | Nakahashi | 359/659 |
| 4,867,546 | 9/1989 | Nishioka et al. | 359/714 |

FOREIGN PATENT DOCUMENTS 60-169818  9/1985  Japan.
61-162021  7/1986  Japan.
61-169818  7/1986  Japan.

Primary Examiner—Scott J. Sugarman
Attorney, Agent, or Firm—Cushman, Darby & Cushman

[57] ABSTRACT

An objective optical system for endoscopes consisting, in the order from the object side, of a front lens unit having negative refractive power, an aperture stop and a rear lens unit having positive refractive power and comprising at least one aspherical surface in each of said lens units. This objective optical system for endoscopes has distortion of a small absolute value, a distortion curve of natural shapes, favorably corrected aberrations, and is composed of lens elements easily manufacturable.

7 Claims, 10 Drawing Sheets

OBJECTIVE OPTICAL SYSTEM FOR ENDOSCOPES

This is a division of application No. 07/510,661, filed Apr. 18, 1990 now U.S. Pat. No. 5,087,989.

BACKGROUND OF THE INVENTION a) Field of the invention

The present invention relates to an objective optical system for endoscopes such as fiber scopes and nonflexible endoscopes.

b) Description of the prior art

It is demanded for objective lens systems for endoscopes to satisfy the telecentric condition in order to avoid problems such as degradation of transmission efficiency of the offaxial rays through image guides in fiber scopes, degradation of transmission efficiency of the offaxial rays through relay optical systems in nonflexible endoscopes and production of the color shading in video scopes using image pickup devices. Remarkable distortion is produced in the objective lens systems which satisfy the telecentric condition.

Distortion in optical systems is dependent on angle of incidence $\theta_1$ of the principal ray on the entrance pupil.

When image height by $H(\theta_1)$, distortion $D(\theta_1)$ is defined by the following formula (i):

$$D(\theta_1) = 100 \times \left( \frac{H(\theta_1)}{f \tan \theta_1} - 1 \right) (\%) \quad \text{(i)}$$

wherein the reference symbol f represents the focal length of the objective optical system of interest.

Though image height $H(\theta_1)$ is dependent on both the focal length and angle of incidence $\theta_1$, it is generally expressed as a product of the focal length f multiplied by a function of $\theta_1$, i.e., in a form of $H(\theta_1) = fA(\theta_1)$, taking $A(\theta_1)$ as a proper function of $\theta_1$. When this equation is used in the above-mentioned formula (i), it is transformed into the following formula (ii)

$$D(\theta_1) = 100 \times \left( \frac{A(\theta_1)}{\tan \theta_1} - 1 \right) (\%) \quad \text{(ii)}$$

Since the relationship between distortion $D(\theta_1)$ and the angle of incidence $\theta_1$ of the principal ray is determined simply by the function representing the relationship between the image height $H(\theta_1)$ and angle of incidence $\theta_1$, the function $A(\theta_1)$ represents the distortion in the optical system of interest.

The function $A(\theta_1)$ is generally dependent only on imaged condition of pupil, and this dependency is classified into dependency on the paraxial magnification and dependency on aberrations of image of pupil (offence degree of the sine condition and spherical aberration when the pupil is considered as an object point). When the optical system is free from the aberrations of pupil, i.e., on an assumption that the sine condition of pupil is satisfied at all image heights in the objective optical system, and the spherical aberration of pupil is not produced neigher at the entrance pupil nor the exit pupil, $A(\theta_1)$ is determined uniquely by using the paraxial magnification of pupil $\beta_E$ of the entire optical system as a parameter. That is to say, $A(\theta_1)$ is given by the following formula (iii):

$$A(\theta_1) = \frac{\sin \theta_1}{\sqrt{1 - (\sin^2 \theta_1)/\beta_E^2}} \quad \text{(iii)}$$

In order to satisfy the telecentric condition, it is necessary to reserve a sufficiently large absolute value $|\beta_E|$ for the paraxial magnification of an objective lens system for endoscopes.

When $|\beta_E|$ has a sufficiently large value, it is possible from the formula (iii) to approximate $A(\theta_1)$ as follows:

$$A(\theta_1) \approx \sin \theta_1$$

Hence, it is possible from the formula (iii) to express distortion $D(\theta_1)$ as follows:

$$D(\theta_1) \approx 100 \times (\cos \theta_1 - 1) \, (\%)$$

It is understood from this formula that negative distortion is aggravated as $\theta_1$ increases.

In an objective lens system for endoscopes which must satisfy the telecentric condition as described above, remarkable distortion is produced due to the paraxial magnification of pupil. In order to correct this distortion, it is necessary to forcibly increase the offence degree of the sine condition remarkably for the image of pupil.

As is understood from the foregoing description, the correction of distortion in an objective lens system for endoscopes is characterized in that it requires forcible production of a specific type of aberration. When the specific type of aberration which is not produced ordinarily in an objective lens system for endoscopes is forcibly produced, there will result in difficulty in correction of the other types of aberrations.

When offence degree of the sine condition of image of pupil is increased for correcting distortion in an optical system for endoscopes, the asymmetrical aberrations, i.e., astigmatism and coma, are influenced directly. Further, when an attempt is made to design a compact wide-angle objective optical system, it will become difficult to correct aberrations, especially the offaxial aberrations. Therefore, correction of aberrations other than distortion is the key point in designing an objective optical system for endoscopes when it has a wide angle, sufficiently corrected distortion and a compact size (especially a small outside diameter).

The objective optical system disclosed by Japanese Patent Kokai Publication No. 61-169818 consists of a front lens group and a rear lens group which are arranged on both sides of a stop, comprises at least one aspherical surface in the front lens group, is designed as a telecentric system and has corrected distortion. However, this conventional objective optical system is not compact.

Further, the optical system disclosed by Japanese Patent Kokai Publication No. 61-162021 consists of a front lens group and a rear lens group which are arranged on both sides of a stop, comprises at least one aspherical surface in each of the lens groups, and has distortion and astigmatism corrected at the same time. Speaking more concretely, this objective optical system corrects astigmatism by utilizing the reverse signs of astigmatism coefficients which are selected for the aspherical surface used in the front lens group for correcting distortion and the aspherical surface used for in the rear lens group correcting distortion. From the viewpoint of practical use, the embodiment described in the specification of this conventional example has the following problems:

(i) The curve illustrating distortion has an unnatural shape.
(ii) The image surfaces, especially the meridional image surface, have high curvature and remarkable condulations are produced at intermediate image heights on the curves illustrating astigmatism. Accordingly, it cannot be said that the image surface is sufficiently flat over the entire range of the visual field of the optical system.
(iii) The lens system has a diameter which is large as compared with the image height, thereby making it impossible to design the optical system compact.
(iv) The aspherical surfaces have a shape wherein an inflection point is located within an effective diameter, thereby making it difficult to machine a die for molding the lens elements with high precision.
(v) The optical system has a narrow visual field.

In an objective optical system for endoscopes having a wide angle, distortion may not be corrected sufficiently and it is obliged to allow more or less distortion to remain in the optical system. When the curve illustrating this residual distortion has a shape similar to that of the distortion produced in the conventional objective optical systems, i.e., distortion of the type expressed by the formula $D(\theta_1) = 100 \times (\cos \theta_1 - 1)$ (%), an objective lens system having the above-mentioned residual distortion will give no unnatural impression even to the users accustomed to observation through endoscopes equipped with the objective lens systems having uncorrected distortion. When a distortion curve varies abruptly at large image heights or has local extreme values at intermediate image heights, however, magnification varies unnaturally dependently on image height, thereby giving unnatural impression during observation. Accordingly, it is necessary to solve (i) out of the problems mentioned above.

Distortion in a telecentric optical system such as an objective optical system for endoscopes is corrected in a way different from that for correcting distortion in an ordinary objective optical system as already described above. Speaking concretely, the correction of distortion in a telecentric optical system requires production of a specific type of aberration, for example, remarkable offence of the sine condition. In order to produce the above-mentioned aberration by using aspherical surfaces, it is obliged to select an abnormally larger departure from the reference sphere for the aspherical surfaces than that for the aspherical surfaces used in other types of optical systems. Since it is additionally required to control shapes of distortion curve and astigmatism curve, the aspherical surfaces to be used in a telecentric optical system are obliged in most case to have a shape wherein the aspherical surfaces have inflection points within the effective diameters thereof. Under the current circumstance of the die machining technique, it is difficult to manufacture dies for molding aspherical lenses having such an aspherical surface shape with surface precision high enough for use in observation systems. Accordingly, even when aspherical lenses are usable in objective optical systems from viewpoint of design, it is practically difficult to manufacture such lenses or impossible to manufacture such lenses with high surface precision. It is therefore required to solve (iv) out of the above-mentioned problems.

SUMMARY OF THE INVENTION

A primary object of the present invention is to provide a compact objective optical system for endoscopes which has a wide angle, a small absolute value of distortion, a distortion curve in a natural shape, aberrations corrected sufficiently for practical use and consists of easily manufacturable lens elements.

The objective optical system for endoscopes according to the present invention consists of a front lens unit having negative refractive power and a rear lens unit having positive refractive power which are arranged with a stop interposed therebetween, comprises at least one aspherical surface in each of the front lens unit and the rear lens unit, and is designed so as to satisfy the following condition (1

$$(1) \quad S(0.8\omega) \geq \frac{3 \tan (0.8\omega/3)}{\sin 0.8\omega} - 1$$

wherein the reference symbol $\omega$ represents half field angle, the reference symbol $S(\theta_1)$ designates a normalized value of offence of the sine condition in the objective optical system as a whole determined by tracing, from the image surface toward the object surface, the principal ray which has an angle of $\theta_1$ relative to the optical axis on the object side of the stop.

Description will be made on the relationship between distortion and offence degree of the sine condition of pupil in an optical system which has an infinite paraxial magnification $\beta_E$ and no spherical aberration at the entrance pupil nor the exit pupil.

In FIG. 1, an objective optical system is composed of a front lens unit $L_1$, a rear lens unit $L_2$ and a stop S. The reference symbol O represents the object surface, the reference symbol I designates the paraxial image surface and the reference symbol P denotes the entrance pupil. When an optional function having a differential coefficient of 1 at $\theta_1=0°$ is expressed as $A(\theta)$, image height $H(\theta_1)$ in this drawing is expressed as $H(\theta_1)=fA(\theta_1)$. From this relationship and the definition of offence degree of the sine condition $H(\theta_1)-f \sin \theta_1$, offence degree of the sine condition of pupil obtained by tracing the principal ray from the image surface toward the object surface is $f\{A(\theta_1)-\sin \theta_1\}$. When a value normalized by dividing $f\{A(\theta_1)-\sin \theta_1\}$ by $f \sin \theta_1$ is represented as $S(\theta_1)$ we obtain the following formula (v):

$$S(\theta_1) = \frac{A(\theta_1)}{\sin \theta_1} - 1 \quad (v)$$

In an optical system having no distortion, a relation of $A(\theta_1)=\tan \theta_1$ establishes. In order to completely correct distortion in a telecentric optical system having infinite $\beta_{ET}$, it is sufficient to produce offence of the sine condition of pupil $S(\theta_1)$ at a degree which is expressed as follows:

$$S(\theta_1) = \frac{\tan \theta_1}{\sin \theta_1} - 1$$

Since it is possible to determine $A(\theta_1)$ reversely from known $S(\theta_1)$, distortion $D(\theta_1)$ can be calculated by the following formula (vi):

$$D(\theta_1) = 100 \times [\{S(\theta_1)+1\} \cos \theta_1 - 1](\%) \quad (vi)$$

Similarly, it is possible to obtain a normalized value of offence of the sine condition of pupil of each of the front lens unit and the rear lens unit by tracing the principal ray from the image surface toward the object surface. When the normalized values are represented by $S_1(\theta_1)$ and $S_1(\theta_1)$ respectively, the following relationship establishes among $S(\theta_1)$, $S_1(\theta_1)$ and $S_2(\theta_1)$:

$$S(\theta_1) + 1 = \{S_1(\theta_1) + 1\}\{S_2(\theta_1) + 1\} \quad \text{(vii)}$$

The formula (vii) allows to determine $S(\theta_1)$ from known $S_1(\theta_1)$ and $S_2(\theta_1)$.

In an actual optical system wherein spherical aberration remain at the entrance pupil and the exit pupil respectively, influence due to the spherical aberration must be taken into consideration. Since distortion varies more or less dependently on location of the object point under the influence due to the above-mentioned spherical aberration, it is desirable that $S_1(\theta_1)$ and $S_2(\theta_1)$ are determined taking the spherical aberration of pupil into consideration. In order to determine $S_1(\theta_1)$ taking the spherical aberration into consideration, it is sufficient to consider the center of the stop S and the object surface O as a hypothetical object point and a hypothetical stop respectively, and trace a ray in the direction indicated by the arrow A from the center of the stop S toward the front lens unit $L_1$. $S_1(\theta_1)$ to be determined as described above can be defined by the following formula (viii):

$$S_1(\theta_1) = \frac{\sin\theta_2/\sin\theta_1}{\beta_1} \cdot \frac{\hat{l}_1}{l_1(\theta_1)} - 1 \quad \text{(viii)}$$

wherein the reference symbol $\theta_2$ represents an angle formed by the principal ray intersecting with the optical axis at the location of the stop, and to be expressed as a value calculated in terms of air when the stop is located in glass. The reference symbol $\hat{\beta}_1$ represents the paraxial magnification of the front lens unit $L_1$ as viewed in the direction from the aperture stop S toward the object surface O (in the direction indicated by the arrow A). The reference symbol $\hat{l}_1$ designates the distance as measured from the object surface O to the paraxial entrance pupil $P_1$ and the reference symbol $l_1(\theta_1)$ denotes the distance as measured from the object surface O to the offaxial entrance pupil $P_2$. These distances $\hat{l}_1$ and $l_1(\theta_1)$ are to be measured taking the object surface as standard and taking the direction indicated by the arrow A as positive.

Similarly, $S_2(\theta_1)$ can be determined by tracing a ray from the aperture stop S toward the rear lens unit $L_2$ in the direction indicated by the arrow B in FIG. 2 taking the center of the aperture stop S and the image surface I as a hypothetical object point and a hypothetical stop respectively. Since the ray is traced for determining $S_2(\theta_1)$ in the direction reverse to that for determining $S_1(\theta_1)$, $S_2(\theta_1)$ is defined as follows:

$$S_2(\theta_1) = \frac{\hat{\beta}_2}{\sin\theta_2/\sin\theta_3} \cdot \frac{l_2(\theta_1)}{\hat{l}_2} - 1 \quad \text{(ix)}$$

wherein the reference symbol $\theta_3$ represents an angle formed between the optical axis and the principal ray emitted from the image surface I as expressed in terms of an angle in air. The reference symbol $\hat{\beta}_2$ designates a magnification for the paraxial pupil as viewed from the aperture stop S toward the image surface I (in the direction indicated by the arrow B). The reference symbol $\hat{l}_2$ denotes the distance as measured from the image surface I to the paraxial exit pupil $P_3$. The reference symbol $l_2(\theta_1)$ represents the distance as measured from the image surface I to the offaxial exit pupil $P_4$. For measuring the distances $l_2$ and $l_2(\theta_1)$, the aperture stop S is taken as standard and the direction indicated by the arrow B is taken as positive. Further, the angles $\theta_1$, $\theta_2$ and $\theta_3$ are considered as negative when the ray becomes closer to the optical axis as it travels in the section before the aperture stop S or when the ray becomes farther from the optical axis as it travels in the section after the aperture stop S.

When values of offence of the sine condition are increased for both the front lens unit and the rear lens unit so as to correct distortion, both $S_1(\theta_1)$ and $S_2(\theta_1)$ have positive values, whereby $S(\theta_1)$ has a positive value as judged from the formula (vii).

When $\theta_1 = \omega$ as exemplified by an embodiment of the present invention to be described later, $S_1(\theta_1)$, $S_2(\theta_1)$ and $S(\theta_1)$ are calculated as follows: $\beta_1 = 0.65689$, $\hat{l}_1 = -22.858$, $l_1(\theta_1) = -22.905$, $\sin\theta_1 = -0.76604$, $\sin\theta_2 = -0.60147$, $S_1(\theta_1) = 0.193$, $\beta_2 = -17.797$, $\hat{l}_2 = 27.049$, $l_2(\omega) = -70.378$, $\sin\theta_2 = -0.60147$, $\sin\theta_3 = -0.01525$, $S_2(\theta_1) = 0.174$, $S(\theta_1) = \{S(\theta_1) + 1\}\{S(\theta_2) + 1\} - 1 = 0.401$ Now description will be made on the ideal shape of a distortion curve which is to be obtained in a case where distortion remains in an objective optical system.

In the formula $H(\theta_1) = fA(\theta_1)$ expressing the relationship between image height and angle of the principal ray, $A(\theta_1)$ represents an optional function established when the differential coefficient at $\theta = 0$ is 1. Since distortion is determined by this function $A(\theta_1)$, it is desirable to set up a target of $A(\theta)$ which becomes $A(\theta_1) = k\tan(\theta_1/k)$ as a function allowing little distortion and having a smoothly varying shape. Relationship between $\theta_1$ and $A(\theta_1)$ at various values of k is illustrated in FIG. 3.

It is sometimes demanded for endoscopes to be equipped with objective optical systems wherein distortion is intentionally allowed to remain, as exemplified by medical endoscopes which are to be used for observing interiors of tubular organs such as bronchus and intestinum crassum with the optical axis set in the longitudinal direction of the tubular organs, or indistrial endoscopes which are to be used for observing interiors of gas pipes and water pipes with the optical axis set in the longitudinal direction of the pipes. In the observation condition illustrated in FIG. 4, it is desirable that the object seen at the marginal portion of the visual field is not deformed due to an object located on the inside surface. In order to satisfy this desire, it is sufficient, taking the direction indicated by the arrow C as the meridional direction and the direction indicated by the arrow D as the sagital direction, to design the objective optical system in such a manner that the magnification in the meridional direction is equal to that in the sagital direction at the marginal portion of the visual field when an object is observed through the objective optical system.

FIG. 6 shows a sectional view presented for describing determinations of magnification $\beta_M(\theta_1)$ in the meridional direction and magnification $\beta_S(\theta_1)$ in the sagital direction in observation of a tube interior. In case of an objective optical system having the characteristic of $A(\theta_1)$, $\beta_M(\theta_1)$ and $\beta_S(\theta_1)$ are expressed by the following formulae respectively:

$$\beta_M(\theta_1) = -\frac{f}{R} \sin^2 \theta_1 \cdot \frac{dA(\theta_1)}{d\theta_1}$$

$$\beta_S(\theta_1) = \frac{f}{R} \cdot A(\theta_1)$$

When $A_1(\theta_1) = k \tan(\theta_1/k)$, a relation between $\theta_1$ and k which gives $$\left| \frac{\beta_M(\theta_1)}{\beta_S(\theta_1)} \right| = 1$$

is expressed by the following formula (x):

$$\frac{2 \sin^2 \theta}{k \sin(2\theta_1/k)} = 1 \quad \text{(x)}$$

The relation between $\theta_1$ and k given by the above-mentioned formula (x) is tabulated below:

| $\theta_1$ | 50° | 60° | 70° | 80° |
|---|---|---|---|---|
| k | 1.18 | 1.53 | 1.81 | 1.96 |

As is judged from the above-mentioned table, the range defined below is the most desirable for $A(\theta_1)$ of an objective optical system which can satisfy the above-mentioned demand for tube interior observation and has a field angle of 100° or larger, or the objective optical system should desirably have a little negative residual distortion:

$$1.15 \tan(\theta_1/1.15) \sim 2 \tan(\theta_1/2)$$

When the value of k satisfying the formula (x) at $\theta_1 = \omega$ is represented by $k(\omega)$, it is possible, in case of an objective optical system having a field angle of $2\omega$, to equalize magnification in the sagital direction to that in the meridional direction at the outermost portion of visual field and smooth the distortion curve thereof by designing the objective optical system so as to have a distortion characteristic of $A(\theta_1) = k(\omega) \cdot \tan\{\theta_1/k(\omega)\}$, i.e., distortion $D(\theta_1)$ which is expressed by the following formula (xi):

$$D(\theta_1) = 100 \times \left[ \frac{k(\omega) \cdot \tan\{\theta_1/k(\omega)\}}{\tan \theta_1} - 1 \right] (\%) \quad \text{(xi)}$$

Further, when it is desired to equalize magnification in the sagital direction to that in the meridional direction inside the outermost portion of visual field, it is sufficient to select as $\theta_1$ a value which is smaller than $\omega$.

In case of an objective optical system to be used for a purpose other than observation of tube interior, it is desirable, needless to say, that the optical system has no distortion, or $A(\theta_1) = \tan \theta_1$.

On the basis of the description made above, significance of condition (1) will be explained.

The condition (1) is required for sufficiently correcting distortion.

In a telecentric optical system, distortion cannot be corrected sufficiently when the optical system does not have a sufficiently large value of offence of the sine condition of pupil. In order to correct distortion in the telecentric objective optical system to a level enough to satisfy the demand for the observation of pipe interiors, it is necessary to increase value of offence of the sine condition in the optical system as a whole at least to a level assuring $A(\theta_1) = 3 \tan(\theta_1/3)$ in practical use. When half field angle is represented by $\omega$, it is sufficient, as judged from the formula (v), to satisfy the following condition (1) for sufficiently correcting distortion at $\theta = 0.8\omega$:

$$\text{(1)} \quad S(0.8\omega) \geq \frac{3 \tan(0.8\omega/3)}{\sin 0.8\omega} - 1$$

If $S(0.8\omega)$ is not within the range defined by the condition (1), distortion will undesirably be corrected insufficiently.

In the next place, the objective optical system for endoscopes according to the present invention satisfies the following condition (2):

$$\text{(2)} \quad 0.6 < \frac{S(\theta_1)}{S_k(\theta_1)} < 1.7 \text{ within a range of } 0.6\omega \leq \theta_1 \leq \omega$$

wherein $S_k(\theta) = \frac{k_{0.8\omega} \tan(\theta_1/k_{0.8\omega})}{\sin \theta_1} - 1$, and $k_{0.8\omega}$ is to be selected so as to satisfy the following formula:

$$S(0.8\omega) = \frac{k_{0.8\omega} \tan(0.8\omega/k_{0.8\omega})}{\sin 0.8\omega} - 1$$

The condition (2) is required for approximating shape of the distortion curve of the objective optical system to that of the optical system having $A(\theta_1) = k \tan(\theta_1/k)$. On an assumption that the objective optical system has $A(\theta_1) = k \tan(\theta_1/k)$ and k satisfying the formula (v) at $\theta_1 = 0.8\omega$, $k_{0.8\omega}$ satisfies the following formula (xii):

$$S(0.8\omega) = \frac{k_{0.8\omega} \tan(0.8\omega/k_{0.8\omega})}{\sin 0.8\omega} - 1 \quad \text{(xii)}$$

In order to design the objective optical system so as to have distortion of the type of $k_{0.8\omega} \tan(\theta_1/k_{0.8\omega})$ by using $k_{0.8\omega}$, it is sufficient to set $S(\theta_1)$ at this time as $S_k(\theta_1)$ and design the objective optical system so as to always satisfy the following formula (xiii) regardless of value of $\theta_1$.

$$S_k(\theta_1) = \frac{k_{0.8\omega} \tan(\theta_1/k_{0.8\omega})}{\sin \theta_1} - 1 \quad \text{(xiii)}$$

In practice, it is not necessary to match $S(\theta_1)$ of the objective optical system completely with $S_k(\theta_1)$, or it is sufficient that $S(\theta_1)/S_k(\theta_1)$ is nearly equal to 1 and the condition (2) is satisfied within a range from $0.6\omega$ to $\omega$ wherein distortion is to be corrected at a high degree.

If the condition (2) is not satisfied within the range of $0.6\omega \leq \theta_1 \leq \omega$, the objective optical system will have a distortion curve which is abnormal or has a shape is apart from that of the distortion curve of the type of $k \tan(\theta_1/k)$, thereby giving unnatural impression to observers.

Further, it is desirable that the objective optical system for endoscopes according to the present invention satisfies the following condition (3):

$$(3) \quad 0.15 < \frac{S_2(0.8\omega)}{S_1(0.8\omega)} < 4$$

wherein the reference symbols $S_1(0.8\omega)$ and $S_2(0.8\omega)$ represent values of $S_1(\theta_1)$ and $S_2(\theta_2)$ respectively when $\theta_1 = 0.8\omega$.

The condition (3) is required for correcting astigmatism at large image heights. The optical system desclosed by Japanese Patent Kokai Publication No. Sho 61-162021 corrects astigmatism by defining the astigmatism coefficient of the third order for the aspherical surfaces used therein. However, as is clear from the astigmatism curves of the embodiments of the optical system described in the patent specification thereof, astigmatism is not corrected sufficiently at large image heights in this optical system.

By utilizing the fact that amount of the astigmatism produced by correction of distortion or offence of the sine condition is related to degree of correction of distortion, i.e., degree of offence of the sine condition, the present invention corrects astigmatism at large image heights by balancing degree of offence of the sine condition between both the sides of an aperture stop.

Though astigmatism is undercorrected by selecting $S_1(\theta_1) > 0$ for the front lens unit, astigmatism is overcorrected by selecting $S_2(\theta_1) > 0$ for the rear lens unit. Accordingly, astigmatism is favorably corrected when $$\frac{S_2(\theta_1)}{S_1(\theta_1)}$$

has a value close to 1.

By designing the objective optical system so as to satisfy the condition (3) at $\theta_1 = 0.8\omega$, it is possible to reduce the astigmatism to be produced by correcting distortion.

If the condition (3) is not satisfied, astigmatism will undesirably be produced remarkably at large image heights due to the correction of distortion.

Furthermore, in order to obtain an astigmatism curve which is ondulated little and shapes of the aspherical surfaces which has no inflection point, it is desirable to satisfy the following condition (4):

$$(4) \quad 0.4 < \frac{S_2(\theta_1)/S_1(\theta_1)}{S_2(0.8\omega)/S_1(0.8\omega)} < 2.5$$

within a range of $0.6\omega \geq \theta_1 \geq \omega$

The condition (3) defines shares of the distortion correcting function at $\theta_1 = 0.8\omega$ between the front lens unit and the rear lens unit. If the ratio between the shares of the above-mentioned correcting function largely varies at $\theta_1 \neq 0.8\omega$, the correction of the astigmatism is remarkably unbalanced, thereby producing large ondulation of the astigmatism curve. This ondulation gives influence on the shapes of the aspherical surfaces, thereby producing inflection points and/or abrupt variations. In order to prevent this defect from being produced, it is desirable that $S_1(\theta_1)$ and $S_2(\theta_1)$ have large absolute values so that the following formula mentioned in the condition (4) has a value close to 1 within the range of $0.6\omega \leq \theta_1 \leq \omega$ wherein astigmatism is largely influenced by the absolute values.

$$\frac{S_2(\theta_1)/S_1(\theta_1)}{S_2(0.8\omega)/S_1(0.8\omega)}$$

When the above-mentioned formula has a value close to 1, the astigmatism curve is not ondulated by the correction of distortion and the aspherical surfaces have the shapes which desirably have no inflection point. From the viewpoint of practical use, it is sufficient for the objective optical system to satisfy the condition (4).

If the condition (4) is not satisfied, the astigmatism curve will be remarkably ondulated and the aspherical surfaces will undesirably have shapes which can hardly be manufacturable in practice.

Moreover, the objective optical system for endoscopes according to the present invention is designed so as to satisfy the following conditions (5), (6) and (7):

(5) $|\beta_E| > 2.5$
(6) $|f_1/f| < 3.5$
(7) $|f_2/f| < 2.5$ wherein the reference symbol $\beta_E$ represents paraxial magnification of pupil, the reference symbol f designates focal length of the objective optical system as a whole, the reference symbol $f_1$ denotes focal length of the front lens unit and the reference symbol $f_2$ represents focal length of the rear lens unit.

The condition (5) defines the telecentric condition. It is preferable to select a value larger than 2.5 as the absolute value of the paraxial magnification of pupil $\beta_E$ obtained by tracing a ray from the object surface toward the image surface, since such a paraxial magnification prevents the principal ray emerging from the image surface from being inclined so much even when the objective optical system has a wide angle, thereby making it possible to prevent loss of light amount and production of color shading when an image of object is to be transmitted through an image guide fiber bundle or received by a solid-state image pickup device. If $\beta_E$ is smaller than 2.5, however, inclination of the principal ray emerging from the image surface will be increased, thereby undesirably increasing loss of light amount to be transmitted through an image guide or a relay optical system, and constituting the problems of color shading, etc.

The conditions (6) and (7) are required for designing a compact objective optical system and favorably correcting curvature of field. When the conditions (6) and (7) are satisfied, it is possible to reduce the outside diameters of the lens units, shorten total length of the optical system and favorably correct curvature of field. If $|f_1/f|$ is larger than 3.5, the front lens will undesirably have a large outside diameter. If $|f_2/f|$ is larger than 2.5, total length of the optical system will be prolonged and curvature of field will undesirably be overcorrected.

It is desirable that the aspherical surfaces to be used in the objective optical system according to the present invention described above for accomplishing the object of the present invention are convex on the object side in the front lens unit and convex on the image side in the rear lens unit. These aspherical surfaces are characterized in that refractive powers thereof are varied dependently on the distances as measured from the optical axis. Owing to this characteristic, these aspherical surfaces can correct curvature of field even when the principal ray is not incident obliquely on the aspherical surfaces. Further, in order to prevent coma from being produced by these aspherical surfaces, it is desirable to locate the centers of curvature on the reference spheres on the stop side of the aspherical surfaces, i.e., to make concave toward the stop the spherical surface which is contact with the aspherical surface on the optical axis.

In the front lens unit, it is desirable to adopt the aspherical surface as the first surface on which the principal ray is high. For the rear lens unit, it is desirable to use an aspherical surface which can satisfy the following conditions (8) and (9) simultaneously for correcting curvature of field and distortion at the same time:

(8) $|h_{am}/r_s| > 0.7$
(9) $|h_{ac}/I| > 0.6$ wherein the reference symbol $h_{am}$ represents height of the marginal ray on the aspherical surface, the reference symbol $h_{ac}$ designates height, on the aspherical surface, of the principal ray to attain to the maximum image height, the reference symbol $r_s$ denotes radius of the stop and the reference symbol I represents the maximum image height.

Though the aspherical surfaces used in the front lens unit of the embodiments to be described later have positive refractive powers strengthened at the marginal portion of the aspherical surface, the aspherical surfaces may have negative refractives power weakened at the marginal portions of the aspherical surfaces.

Similarly, it is desirable that the aspherical surfaces to be used in the rear lens unit have refractive power as strong as possible on the optical axis when the aspherical surfaces are adopted as surfaces having positive refractive power. When radius of curvature of the aspherical surface as measured on the optical axis is represented by $r_a$, it is desirable to design the aspherical surface so as to satisfy the following condition (10):

$|r_a/f| < 2.8$ (10)

When $P=1$ (P represents the conical coefficient) in the formula expressing shape of aspherical surface and height of ray exceeds the radius of curvature, tracing of ray is not permitted by the aspherical surface which has a small radius of curvature on the optical axis as defined by the condition (10) and refractive power is weakened at the marginal portion thereof. Therefore, it is desirable that the aspherical surface has P larger than 1.

In the front lens unit, overcorrection of curvature of field is prevented by arranging a surface having negative refractive power at a location not too close to the stop. For this purpose, it is desirable to impart negative refractive power to the image side surface of the lens element having the aspherical surface on the object side, design this aspherical lens element as a negative meniscus lens element to be arranged in the front lens unit and concentrate the negative refractive power of the front lens unit onto the negative meniscus lens element.

It is desirable to design the negative meniscus lens element so as to satisfy the following condition (11):

$|f_a/f| < 4$ (11)

wherein the reference symbol $f_a$ represents focal length of the negative meniscus lens element which is designed as the aspherical lens element.

Further, in order to correct lateral chromatic aberration in the objective optical system, it is considered to design the lens component arranged on the extremely image side in the optical system as a cemented doublet. When a cemented doublet is arranged on the extremely image side in the optical system, however, it is unnecessary to strengthen refractive power of the cemented surface by reserving a large difference in refractive index between both the lens elements of the cemented doublet. Accordingly, the lens component arranged on the extremely image side in the optical system may be designed as a single lens element when a little lateral chromatic aberration is allowable.

When a cemented doublet is to be arranged on the extremely image side in the objective optical system, the cemented surface of the cemented doublet may be convex or concave on the object side. Furthermore, in order to sufficiently correct lateral chromatic aberration in the objective optical system, it is desirable to select an Abbe's number for the positive lens element of the cemented doublet which is at least 15 larger than the Abbe's number of the negative lens element. It is preferable that radius of curvature $r_c$ of the cemented doublet satisfies the following condition (12):

$|r_c/f| < 3.5$ (12)

When the objective optical system according to the present invention is to be used with a fiber scope, it is desirable that the cemented doublet or the single-element lens component arranged on the extremely image side in the objective optical system is cemented to the leading end surface of an image guide.

DETAILED DESCRIPTION OF THE PREFERRED EMBODIMENTS

Figure 1:
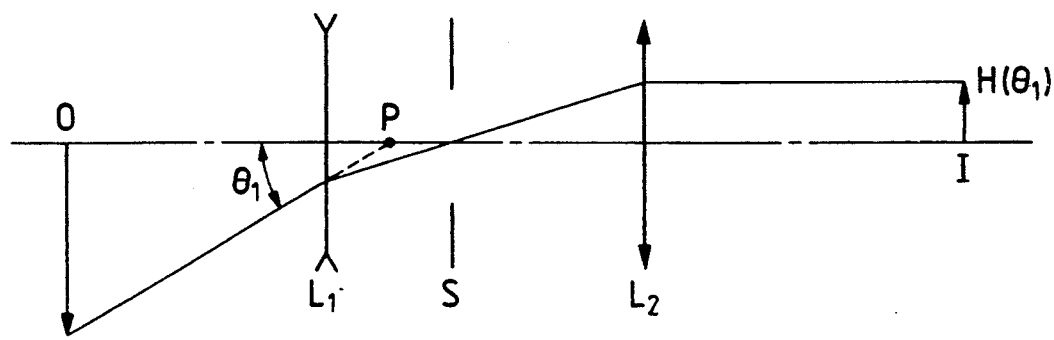
FIG. 1 and FIG. 2 show schematic diagrams descriptive of the design principle of the objective optical system for endoscopes according to the present invention.
Figure 2:
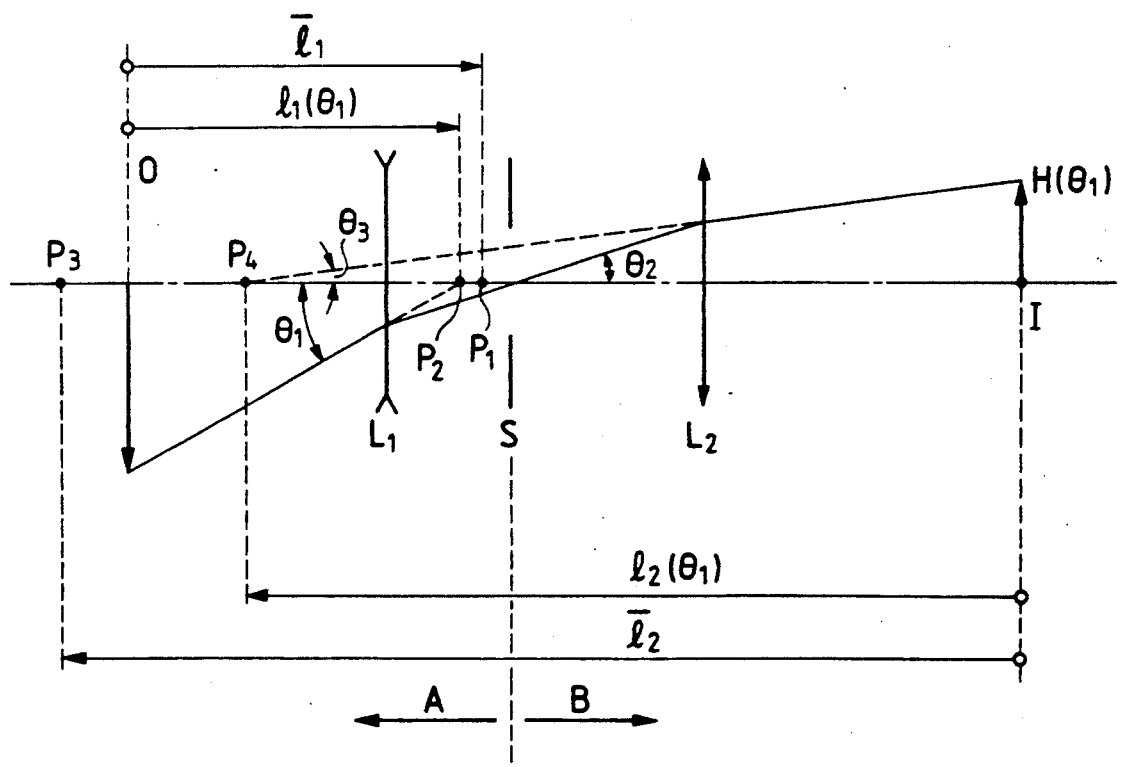
Figure 3:
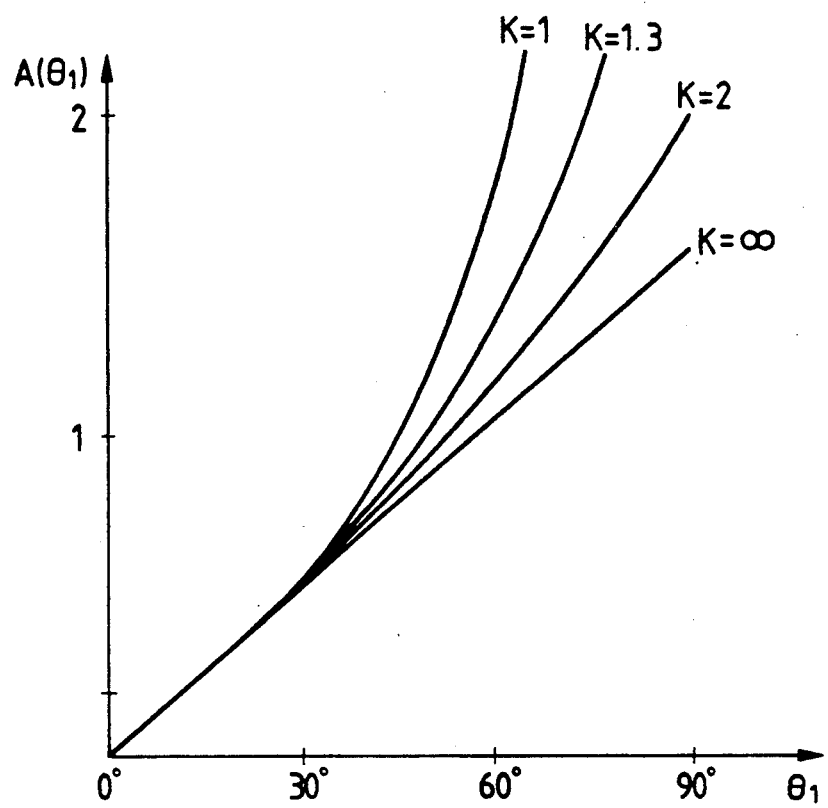
FIG. 3 shows curves illustrating the function used in the design principle for the objective optical system according to the present invention.
Figure 4:
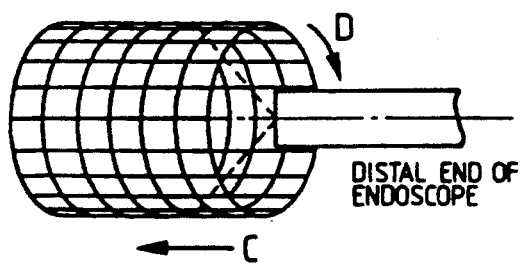
FIG. 4 shows a schematic representation illustrating the condition for observing tube interior through an endoscope.
Figure 5:
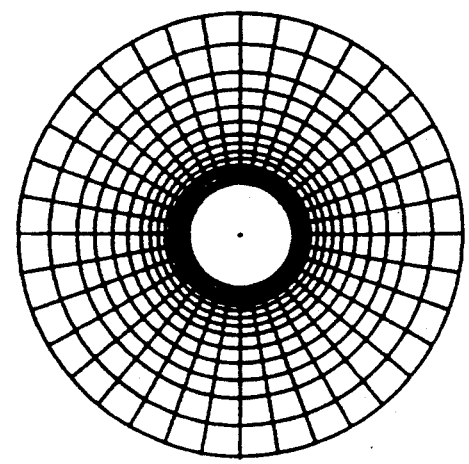
FIG. 5 shows a diagram schematically illustrating an image observed in the condition shown in FIG. 4.
Figure 6:
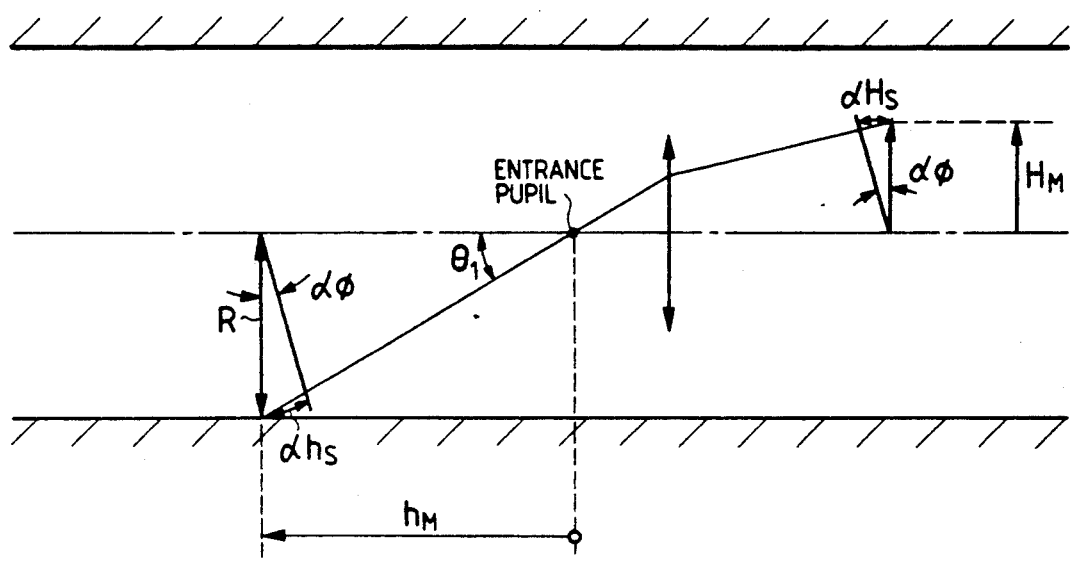
FIG. 6 shows a schematic sectional view used for determining magnifications in the meridional direction and the sagital direction in the condition shown in FIG. 4.

Now, objective optical system for endoscopes according to the present invention will be described more detailedly below with reference to the preferred embodiments shown in the accompanying drawings and given in the form of the following numerical data:

Embodiment 1
f = 1.000, F/2.1, 2ω = 100.0°
object distance = −21.5246, IH = 1.07

-continued

| | | | |
|---|---|---|---|
| $r_1 = 7.9349$ (aspherical surface) | | | |
| | $d_1 = 0.5740$ | $n_1 = 1.51633$ | $\nu_1 = 64.15$ |
| $r_2 = 1.1075$ | | | |
| | $d_2 = 1.4037$ | | |
| $r_3 = \infty$ (stop) | | | |
| | $d_3 = 0.1563$ | | |
| $r_4 = -13.5146$ | | | |
| | $d_4 = 0.7294$ | $n_2 = 1.72916$ | $\nu_2 = 54.68$ |
| $r_5 = -2.6819$ | | | |
| | $d_5 = 0.1435$ | | |
| $r_6 = \infty$ | | | |
| | $d_6 = 1.7282$ | $n_3 = 1.56384$ | $\nu_3 = 60.69$ |
| $r_7 = -1.4361$ (aspherical surface) | | | |
| | $d_7 = 0.3126$ | | |
| $r_8 = 3.4873$ | | | |
| | $d_8 = 1.8005$ | $n_4 = 1.72916$ | $\nu_4 = 54.68$ |
| $r_9 = -1.9006$ | | | |
| | $d_9 = 0.9647$ | $n_5 = 1.84666$ | $\nu_5 = 23.78$ |
| $r_{10} = \infty$ | | | | aspherical coefficient
(1st surface)
$P = 1.0000, \quad E = 0.26270 \times 10^{-1}$
$F = -0.22085 \times 10^{-2}, \quad G = 0.19168 \times 10^{-3}$
(7th surface)
$P = -0.2727$ Embodiment 2
$f = 1.000, \quad F/2.5, \quad 2\omega = 110.0°$
object distance $= -21.3464, \quad IH = 1.15$

| | | | |
|---|---|---|---|
| $r_1 = 32.6142$ (aspherical surface) | | | |
| | $d_1 = 0.5692$ | $n_1 = 1.51633$ | $\nu_1 = 64.15$ |
| $r_2 = 1.4351$ | | | |
| | $d_2 = 0.7280$ | | |
| $r_3 = 3.5843$ | | | |
| | $d_3 = 0.8539$ | $n_2 = 1.72825$ | $\nu_2 = 28.46$ |
| $r_4 = -2.2531$ | | | |
| | $d_4 = 0.4269$ | $n_3 = 1.72916$ | $\nu_3 = 54.68$ |
| $r_5 = 1.5970$ | | | |
| | $d_5 = 0.1423$ | | |
| $r_6 = \infty$ (stop) | | | |
| | $d_6 = 0.0285$ | | |
| $r_7 = 7.5968$ | | | |
| | $d_7 = 0.4269$ | $n_4 = 1.84666$ | $\nu_4 = 23.78$ |
| $r_8 = 2.6975$ | | | |
| | $d_8 = 1.1385$ | $n_5 = 1.69680$ | $\nu_5 = 55.52$ |
| $r_9 = -1.6051$ | | | |
| | $d_9 = 0.1423$ | | |
| $r_{10} = 8.1760$ | | | |
| | $d_{10} = 1.7077$ | $n_6 = 1.56384$ | $\nu_6 = 60.69$ |
| $r_{11} = -1.3632$ | | | | aspherical coefficient
(1st surface)
$P = 1.0000, \quad E = 0.14041 \times 10^{-1}$
$F = -0.10308 \times 10^{-2}$
(11th surface)
$P = -1.0808$ Embodiment 3
$f = 1.000, \quad F/2.5, \quad 2\omega = 120.0°$
object distance $= -20.6461, \quad IH = 1.33$

| | | | |
|---|---|---|---|
| $r_1 = 7.0564$ (aspherical surface) | | | |
| | $d_1 = 0.6194$ | $n_1 = 1.51633$ | $\nu_1 = 64.15$ |
| $r_2 = 1.1808$ | | | |
| | $d_2 = 0.8258$ | | |
| $r_3 = 4.5076$ | | | |
| | $d_3 = 0.9635$ | $n_2 = 1.84666$ | $\nu_2 = 23.78$ |
| $r_4 = -1.9270$ | | | |
| | $d_4 = 0.4129$ | $n_3 = 1.72916$ | $\nu_3 = 54.68$ |
| $r_5 = 1.2597$ | | | |
| | $d_5 = 0.2065$ | | |
| $r_6 = \infty$ (stop) | | | |
| | $d_6 = 0.0275$ | | |
| $r_7 = \infty$ | | | |
| | $d_7 = 0.9635$ | $n_4 = 1.69680$ | $\nu_4 = 55.52$ |
| $r_8 = -2.7929$ | | | |
| | $d_8 = 0.1376$ | | |
| $r_9 = \infty$ | | | |
| | $d_9 = 1.6517$ | $n_5 = 1.56384$ | $\nu_5 = 60.69$ |
| $r_{10} = -1.3976$ (aspherical surface) | | | |
| | $d_{10} = 0.3441$ | | |
| $r_{11} = 2.5318$ | | | |
| | $d_{11} = 2.3399$ | $n_6 = 1.51633$ | $\nu_6 = 64.15$ |
| $r_{12} = -2.3399$ | | | |
| | $d_{12} = 0.9635$ | $n_7 = 1.84666$ | $\nu_7 = 23.78$ |
| $r_{13} = \infty$ | | | | aspherical coefficient
(1st surface)
$P = 1.0000, \quad E = 0.12093 \times 10^{-1}$
$F = -0.26078 \times 10^{-3}$
(10th surface)
$P = 0.2591$ Embodiment 4
$f = 1.000, \quad F/2.2, \quad 2\omega = 120.0°$
object distance $= -15.8785, \quad IH = 1.38$

| | | | |
|---|---|---|---|
| $r_1 = 40.6940$ (aspherical surface) | | | |
| | $d_1 = 0.5954$ | $n_1 = 1.51633$ | $\nu_1 = 64.15$ |
| $r_2 = 0.9778$ | | | |
| | $d_2 = 0.6219$ | | |
| $r_3 = \infty$ | | | |
| | $d_3 = 1.0586$ | $n_2 = 1.84666$ | $\nu_2 = 23.78$ |
| $r_4 = \infty$ (stop) | | | |
| | $d_4 = 0.1323$ | | |
| $r_5 = 7.2697$ | | | |
| | $d_5 = 0.5293$ | $n_3 = 1.84666$ | $\nu_3 = 23.78$ |
| $r_6 = 1.9319$ | | | |
| | $d_6 = 1.1909$ | $n_4 = 1.72916$ | $\nu_4 = 54.68$ |
| $r_7 = -2.7086$ | | | |
| | $d_7 = 0.1323$ | | |
| $r_8 = \infty$ | | | |
| | $d_8 = 1.4555$ | $n_5 = 1.56384$ | $\nu_5 = 60.69$ |
| $r_9 = -1.5878$ (aspherical surface) | | | |
| | $d_9 = 0.3308$ | | |
| $r_{10} = 5.5336$ | | | |
| | $d_{10} = 1.8525$ | $n_6 = 1.72916$ | $\nu_6 = 54.68$ |
| $r_{11} = -2.1806$ | | | |
| | $d_{11} = 1.1247$ | $n_7 = 1.84666$ | $\nu_7 = 23.78$ |
| $r_{12} = \infty$ | | | | aspherical coefficient
(1st surface)
$P = 1.0000, \quad E = 0.41617 \times 10^{-1}$
$F = -0.84961 \times 10^{-2}, \quad G = 0.91618 \times 10^{-3}$
(9th surface)
$P = -0.1510, \quad E = 0.49519 \times 10^{-2}$
$F = 0.61943 \times 10^{-2}, \quad G = -0.13154 \times 10^{-2}$ Embodiment 5
$f = 1.000, \quad F/2.5, \quad 2\omega = 120.0°$
object distance $= -21.1249, \quad IH = 1.70$

| | | | |
|---|---|---|---|
| $r_1 = 13.6019$ (aspherical surface) | | | |
| | $d_1 = 0.7922$ | $n_1 = 1.51633$ | $\nu_1 = 64.15$ |
| $r_2 = 1.1795$ | | | |
| | $d_2 = 0.9330$ | | |
| $r_3 = \infty$ | | | |
| | $d_3 = 0.9682$ | $n_2 = 1.84666$ | $\nu_2 = 23.78$ |
| $r_4 = -2.8675$ | | | |
| | $d_4 = 0.5281$ | $n_3 = 1.72916$ | $\nu_3 = 54.68$ |
| $r_5 = \infty$ (stop) | | | |
| | $d_5 = 0.1760$ | | |
| $r_6 = -46.4859$ | | | |
| | $d_6 = 0.7042$ | $n_4 = 1.84666$ | $\nu_4 = 23.78$ |
| $r_7 = 2.8167$ | | | |
| | $d_7 = 1.5844$ | $n_5 = 1.72916$ | $\nu_5 = 54.68$ |
| $r_8 = -2.5200$ | | | |
| | $d_8 = 0.1760$ | | |
| $r_9 = 11.4722$ | | | |
| | $d_9 = 1.5844$ | $n_6 = 1.56384$ | $\nu_6 = 60.69$ |
| $r_{10} = -1.7604$ (aspherical surface) | | | |
| | $d_{10} = 0.4401$ | | |
| $r_{11} = 11.9467$ | | | |
| | $d_{11} = 1.9364$ | $n_7 = 1.72916$ | $\nu_7 = 54.68$ |
| $r_{12} = -2.8167$ | | | |
| | $d_{12} = 0.7042$ | $n_8 = 1.84666$ | $\nu_8 = 23.78$ |
| $r_{13} = \infty$ | | | | aspherical coefficient
(1st surface)
$P = 1.0000, \quad E = 0.20752 \times 10^{-1}$
$F = -0.24468 \times 10^{-2}, \quad G = 0.25107 \times 10^{-3}$
(10th surface)

-continued

P = −1.3114, E = −0.47686 × 10⁻²
F = 0.28030 × 10⁻², G = −0.28628 × 10⁻³

Embodiment 6
f = 1.000, F/2.5, 2ω = 150.0°
object distance = −16.3854, IH = 1.58

| | | | |
|---|---|---|---|
| $r_1 = \infty$ (aspherical surface) | | | |
| | $d_1 = 0.6554$ | $n_1 = 1.51633$ | $\nu_1 = 64.15$ |
| $r_2 = 1.2289$ | | | |
| | $d_2 = 0.6882$ | | |
| $r_3 = \infty$ | | | |
| | $d_3 = 0.8193$ | $n_2 = 1.84666$ | $\nu_2 = 23.78$ |
| $r_4 = -2.4578$ | | | |
| | $d_4 = 0.4916$ | $n_3 = 1.72916$ | $\nu_3 = 54.68$ |
| $r_5 = \infty$ (stop) | | | |
| | $d_5 = 0.1639$ | | |
| $r_6 = -8.8535$ | | | |
| | $d_6 = 0.4916$ | $n_4 = 1.84666$ | $\nu_4 = 23.78$ |
| $r_7 = 4.8120$ | | | |
| | $d_7 = 0.1470$ | $n_5 = 1.72916$ | $\nu_5 = 54.68$ |
| $r_8 = -2.0374$ | | | |
| | $d_8 = 0.1639$ | | |
| $r_9 = \infty$ | | | |
| | $d_9 = 1.4747$ | $n_6 = 1.56384$ | $\nu_6 = 60.69$ |
| $r_{10} = -1.9662$ (aspherical surface) | | | |
| | $d_{10} = 0.4096$ | | |
| $r_{11} = 4.4073$ | | | |
| | $d_{11} = 1.9662$ | $n_7 = 1.72916$ | $\nu_7 = 54.68$ |
| $r_{12} = -2.6217$ | | | |
| | $d_{12} = 0.8894$ | $n_8 = 1.84666$ | $\nu_8 = 23.78$ |
| $r_{13} = \infty$ | | | | aspherical coefficient
(1st surface)
P = 1.0000, E = 0.13321 × 10⁻¹
F = −0.10218 × 10⁻², G = 0.38431 × 10⁻⁴
(10th surface)
P = −0.4609, E = 0.37605 × 10⁻³
F = 0.57002 × 10⁻³, G = 0.98785 × 10⁻⁴

Embodiment 7
f = 1.000, F/2.2, 2ω = 120.0°
object distance = −16.2760, IH = 1.43

| | | | |
|---|---|---|---|
| $r_1 = 7.8025$ (aspherical surface) | | | |
| | $d_1 = 0.6104$ | $n_1 = 1.51633$ | $\nu_1 = 64.15$ |
| $r_2 = 0.7544$ | | | |
| | $d_2 = 1.1784$ | | |
| $r_3 = \infty$ (stop) | | | |
| | $d_3 = 0.0678$ | | |
| $r_4 = -5.4894$ | | | |
| | $d_4 = 0.6699$ | $n_2 = 1.72916$ | $\nu_2 = 54.68$ |
| $r_5 = -1.5687$ | | | |
| | $d_5 = 0.1356$ | | |
| $r_6 = 32.5769$ | | | |
| | $d_6 = 0.5425$ | $n_3 = 1.84666$ | $\nu_3 = 23.78$ |
| $r_7 = 2.0365$ | | | |
| | $d_7 = 1.4920$ | $n_4 = 1.72916$ | $\nu_4 = 54.68$ |
| $r_8 = -2.6177$ | | | |
| | $d_8 = 0.3391$ | | |
| $r_9 = 2.3980$ (aspherical surface) | | | |
| | $d_9 = 2.7825$ | $n_5 = 1.56384$ | $\nu_5 = 60.69$ |
| $r_{10} = \infty$ | | | | aspherical coefficient
(1st surface)
P = 1.0000, E = 0.67089 × 10⁻¹
F = −0.16871 × 10⁻¹, G = 0.32216 × 10⁻²
(9th surface)
P = −1.4442, E = −0.88290 × 10⁻²
F = 0.73299 × 10⁻³ wherein the reference symbols $r_1$, $r_2$, ... represent radii of curvature on the surfaces of the respective lens elements, the reference symbols $d_1$, $d_2$, ... designate thicknesses of the respective lens elements and airspaces reserved therebetween, the reference symbols $n_1$, $n_2$, ... denote refractive indices of the respective lens elements, and the reference symbols $\nu_1$, $\nu_2$, ... represent Abbe's numbers of the respective lens elements.

The shapes of the aspherical surfaces used in the objective optical system according to the present invention is expressed by the following formula:

$$x = \frac{cy^2}{1 + \sqrt{1 - pc^2y^2}} + By^2 + Ey^4 + Fy^6 + Gy^8 + \ldots$$

wherein, the optical axis is taken as the x axis, the intersection between the aspherical surface and the optical axis is taken as the origin, a straight line passing through the origin and perpendicular to the x axis is taken as the y axis, the reference symbol C represents the inverse number of the radius of curvature on the reference sphere, the reference symbol P designates the conical coefficient, and the reference symbols B, E, F, G, ... denote the aspherical surface coefficients.

The values related to the conditions used in the above-described embodiments are listed in the following Table 1. Further, the sine conditions for the preferred embodiments are also summarized in Table 2. Table 3 lists the values for $|r_a/f|$.

TABLE 3

| | Embodiment | | | | | | |
|---|---|---|---|---|---|---|---|
| | 1 | 2 | 3 | 4 | 5 | 6 | 7 |
| $r_a/f$ | 1.4361 | 1.3632 | 1.3976 | 1.8578 | 1.7604 | 1.9662 | 2.3980 |

TABLE 1

| | Embodiment | | | | | | |
|---|---|---|---|---|---|---|---|
| | 1 | 2 | 3 | 4 | 5 | 6 | 7 |
| (1) | 0.128 | 0.133 | 0.152 | 0.196 | 0.324 | 0.110 | 0.194 |
| (2) | | | | | | | |
| 0.6ω | 1.01 | 1.04 | 0.99 | 0.97 | 0.99 | 0.96 | 1.01 |
| ω | 0.99 | 0.92 | 0.94 | 0.94 | 0.99 | 1.05 | 0.97 |
| (3) | 0.95 | 1.21 | 0.53 | 0.99 | 0.81 | 0.86 | 0.42 |
| (4) | | | | | | | |
| 0.6ω | 1.07 | 1.16 | 1.07 | 0.97 | 0.95 | 1.09 | 0.91 |
| ω | 0.95 | 0.89 | 1.05 | 1.05 | 1.13 | 0.99 | 1.16 |
| (5) | 27.1 | 10.8 | 23.0 | 14.7 | 7.5 | 12.6 | 88.0 |
| (6) | 2.57 | 1.45 | 1.25 | 1.95 | 3.05 | 2.86 | 1.67 |
| (7) | 1.56 | 1.55 | 1.42 | 1.70 | 1.78 | 1.65 | 1.66 |
| (8) | 1.20 | 1.12 | 1.64 | 1.25 | 1.17 | 1.23 | 1.02 |
| (9) | 0.89 | 0.95 | 0.86 | 0.89 | 0.97 | 0.93 | 0.95 |
| (11) | 2.57 | 2.93 | 2.85 | 1.95 | 2.56 | 2.38 | 1.67 |

TABLE 2

| | Embodiment | | | | | | |
|---|---|---|---|---|---|---|---|
| | 1 | 2 | 3 | 4 | 5 | 6 | 7 |
| ω | | | | | | | |
| $S_1$ | 0.193 | 0.186 | 0.302 | 0.265 | 0.418 | 0.329 | 0.371 |
| $S_2$ | 0.174 | 0.200 | 0.168 | 0.276 | 0.382 | 0.281 | 0.182 |
| S | 0.401 | 0.423 | 0.521 | 0.614 | 0.960 | 0.702 | 0.621 |
| 0.8ω | | | | | | | |
| $S_1$ | 0.114 | 0.112 | 0.190 | 0.164 | 0.240 | 0.184 | 0.231 |
| $S_2$ | 0.108 | 0.136 | 0.101 | 0.163 | 0.195 | 0.158 | 0.098 |
| S | 0.234 | 0.263 | 0.310 | 0.354 | 0.482 | 0.371 | 0.352 |
| $k_{0.8\omega}$ | 1.18 | 1.27 | 1.31 | 1.20 | 1.01 | 1.78 | 1.21 |
| 0.6ω | | | | | | | |
| $S_1$ | 0.059 | 0.057 | 0.097 | 0.085 | 0.123 | 0.090 | 0.124 |
| $S_2$ | 0.060 | 0.080 | 0.055 | 0.082 | 0.095 | 0.084 | 0.048 |
| S | 0.123 | 0.142 | 0.157 | 0.174 | 0.230 | 0.182 | 0.178 |

In the Table 1, items (1) through (11) are the values having relations to the conditions (1) through (11) respectively. That is to say, the items (1) through (11) indicate the values of the formulae listed below:

(1) $S(0.8\omega) = \frac{3\tan(0.8\omega/3)}{\sin 0.8\omega} + 1$ (2) $\frac{S(\theta_1)}{S_k(\theta_1)}$ (in a case where $\theta_1$ is $0.6\omega$ and another case where $\theta_1$ is $\omega$.)

(3) $\frac{S_2(0.8\omega)}{S_1(0.8\omega)}$ (4) $\frac{S_2(\theta_1)/S_1(\theta_1)}{S_2(0.8\omega_1)/S_1(0.8\omega_2)}$ (in a case where $\theta_1$ is $0.6\omega$ and another case where $\theta_1$ is $\omega$.)

Figure 7:
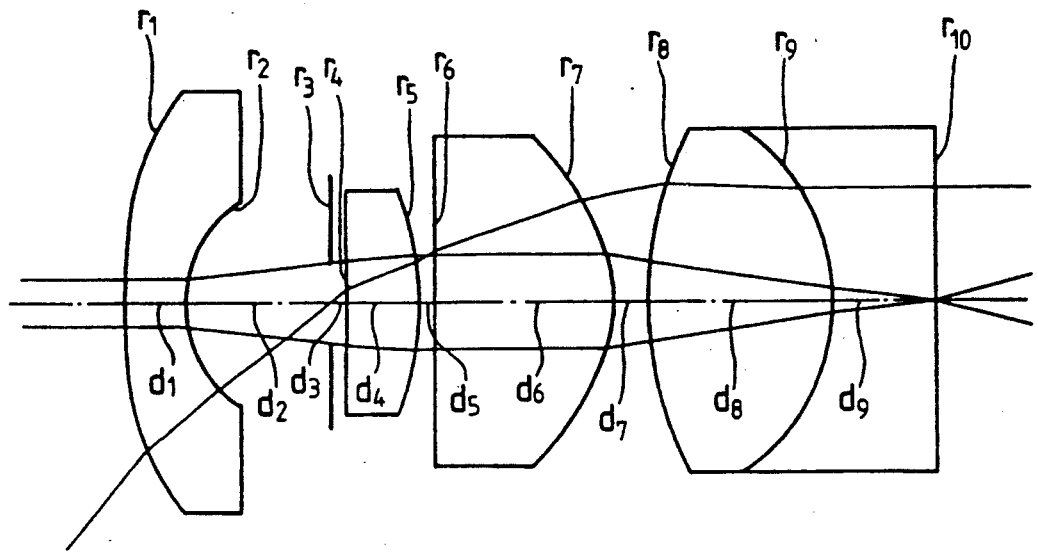
FIG. 7 through FIG. 13 show sectional views illustrating compositions of Embodiments 1 through 7 of the objective optical system according to the present invention.
Figure 8:
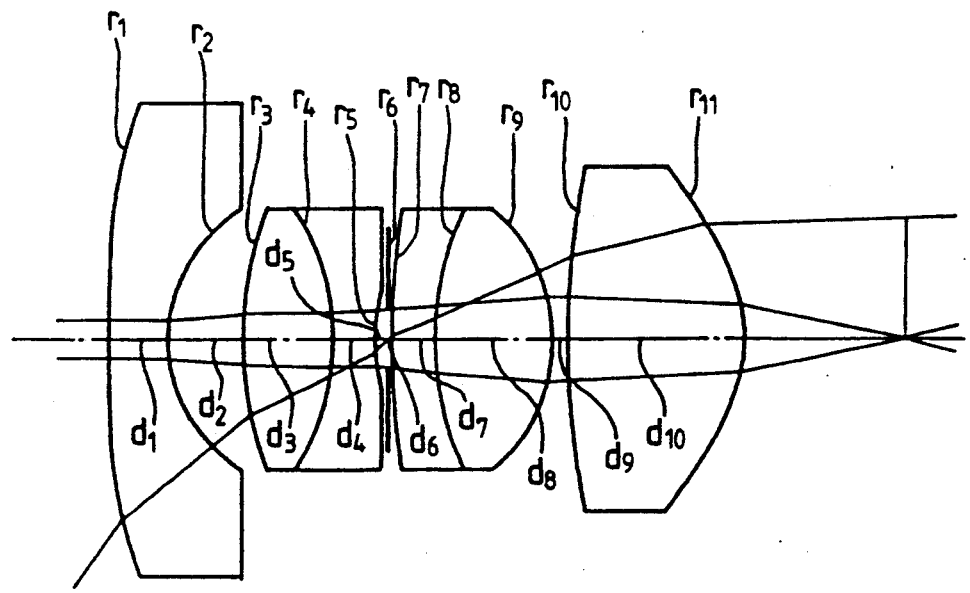
Figure 9:
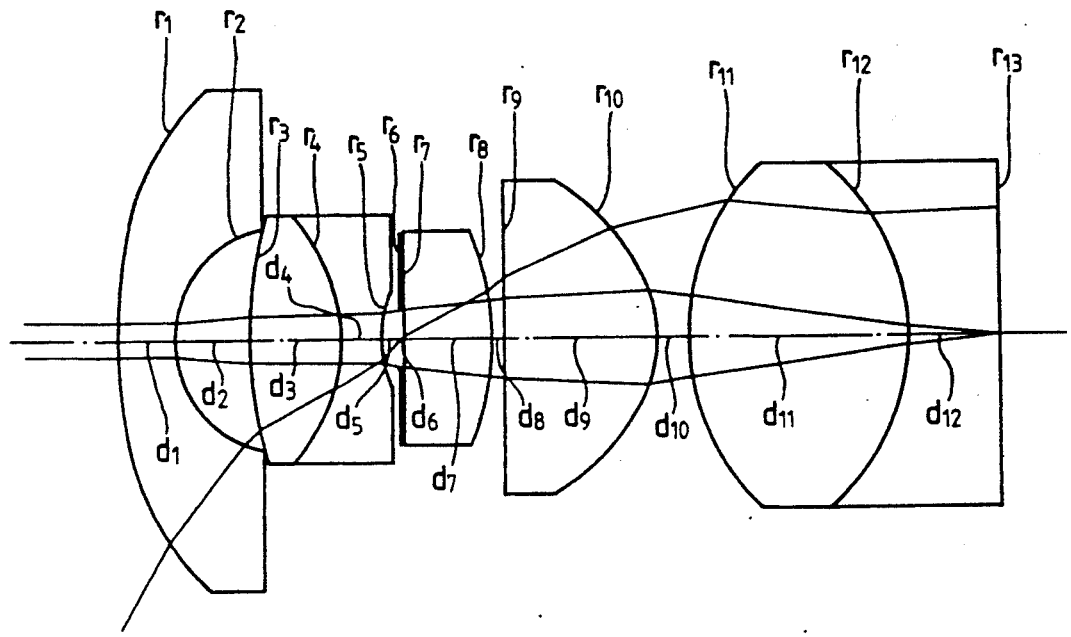
Figure 10:
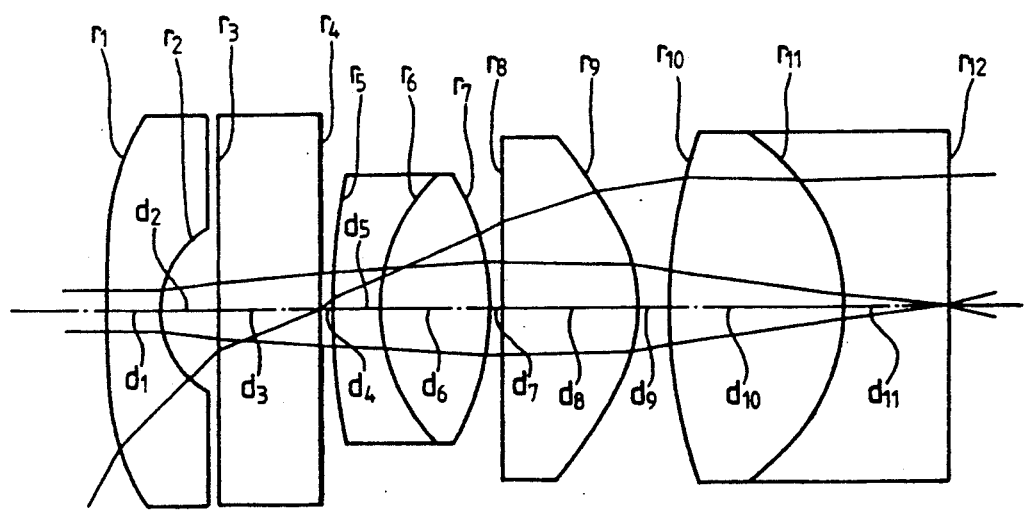
Figure 11:
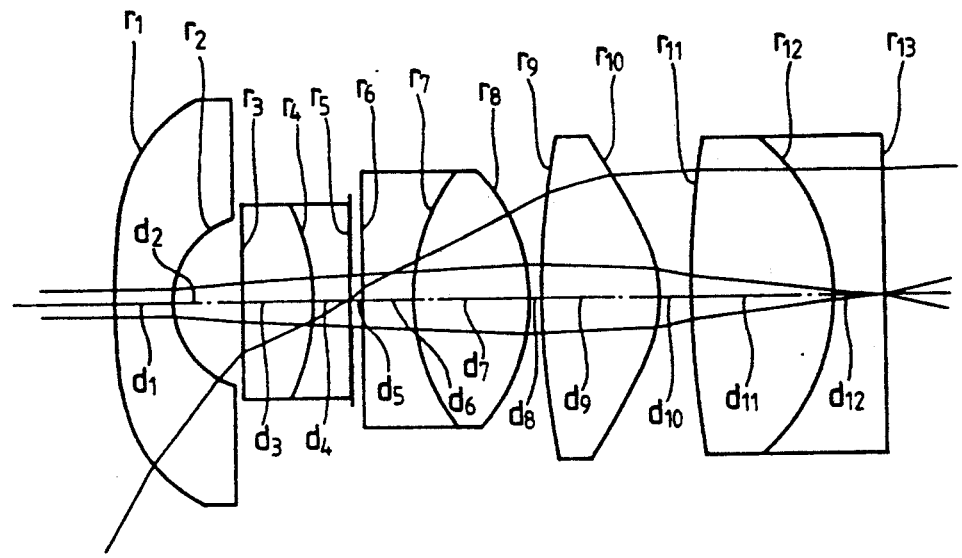
Figure 12:
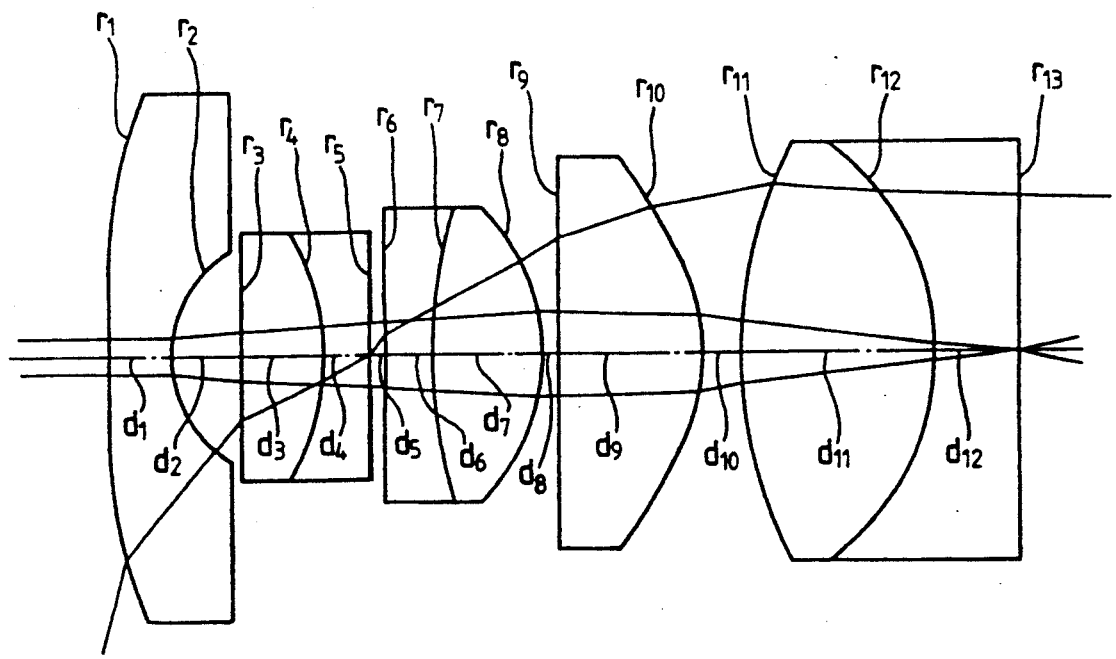
Figure 13:
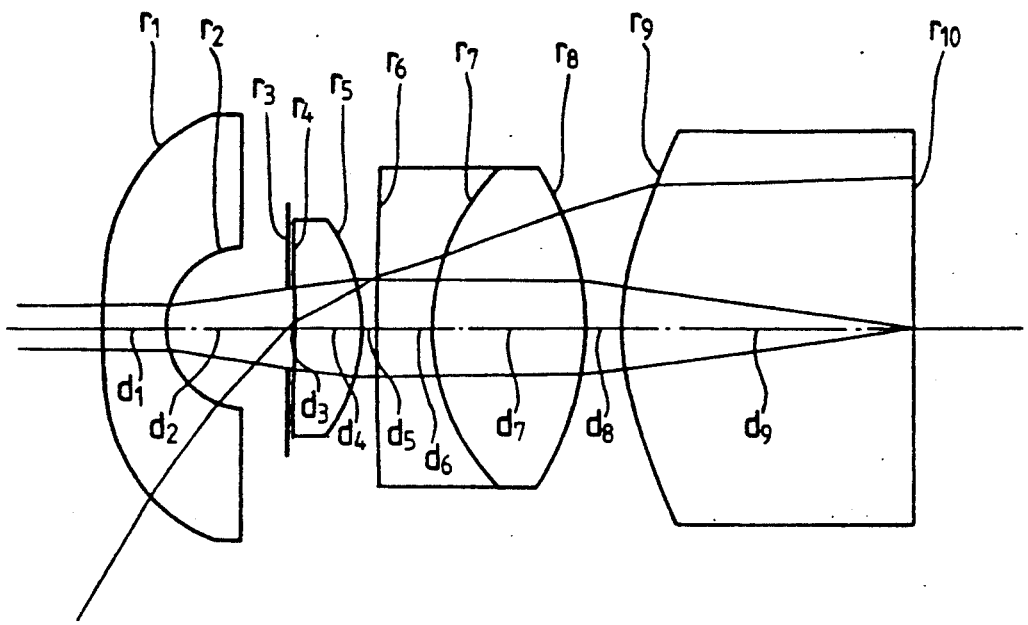
Figure 14:
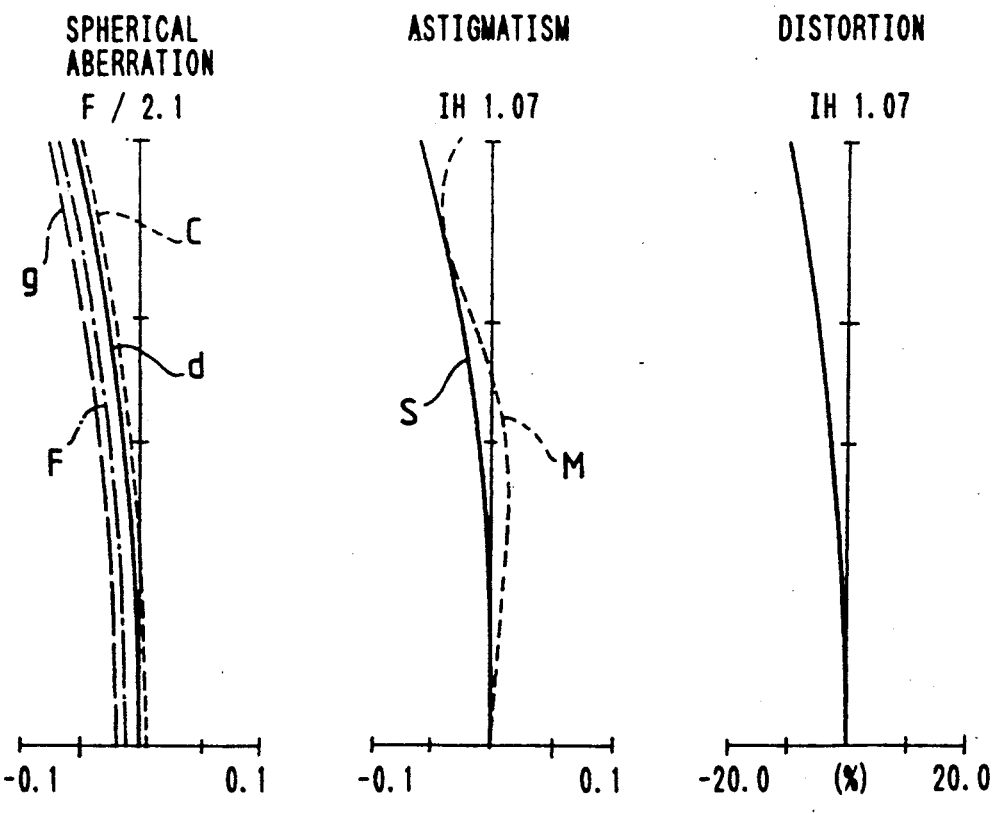
FIG. 14 through FIG. 20 show curves illustrating aberration characteristics of the Embodiments 1 through 7 of the present invention.
Figure 15:
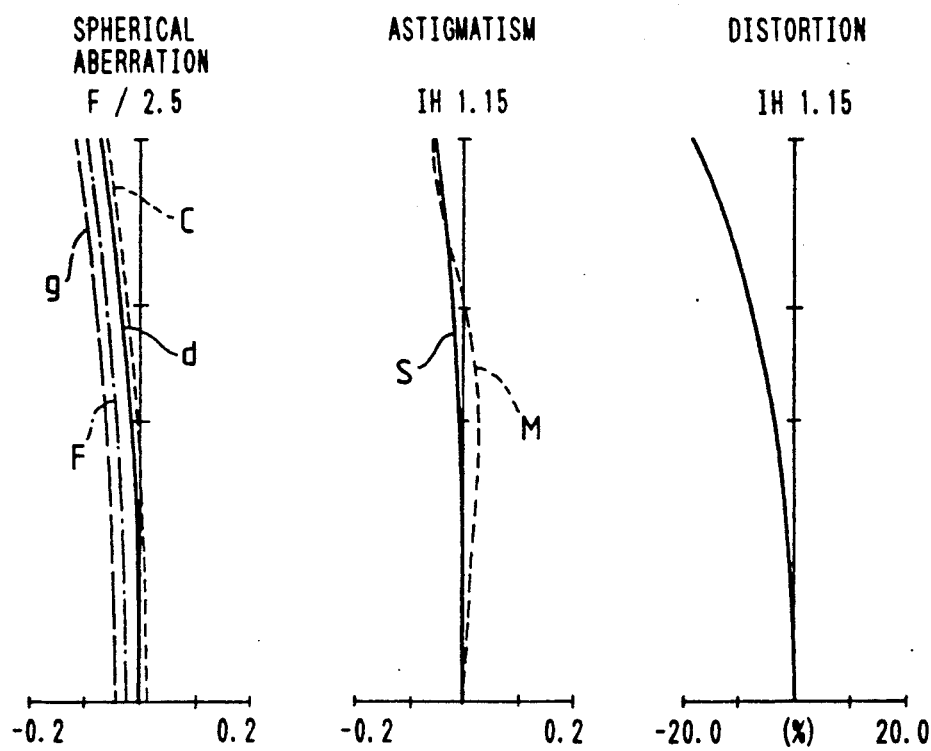
Figure 16:
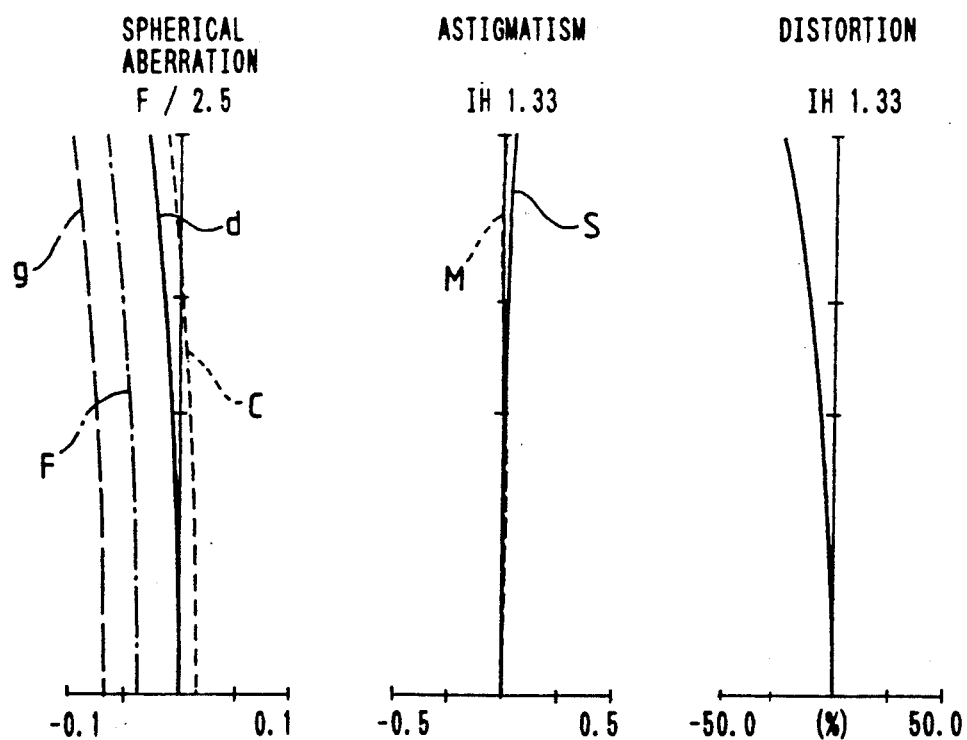
Figure 17:
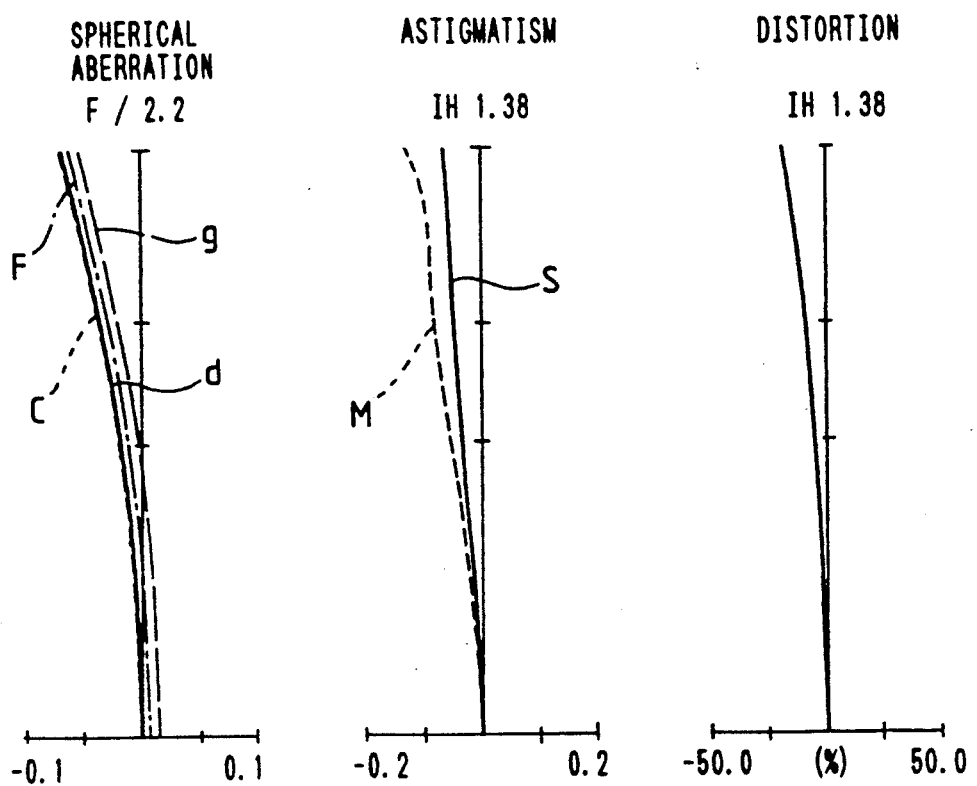
Figure 18:
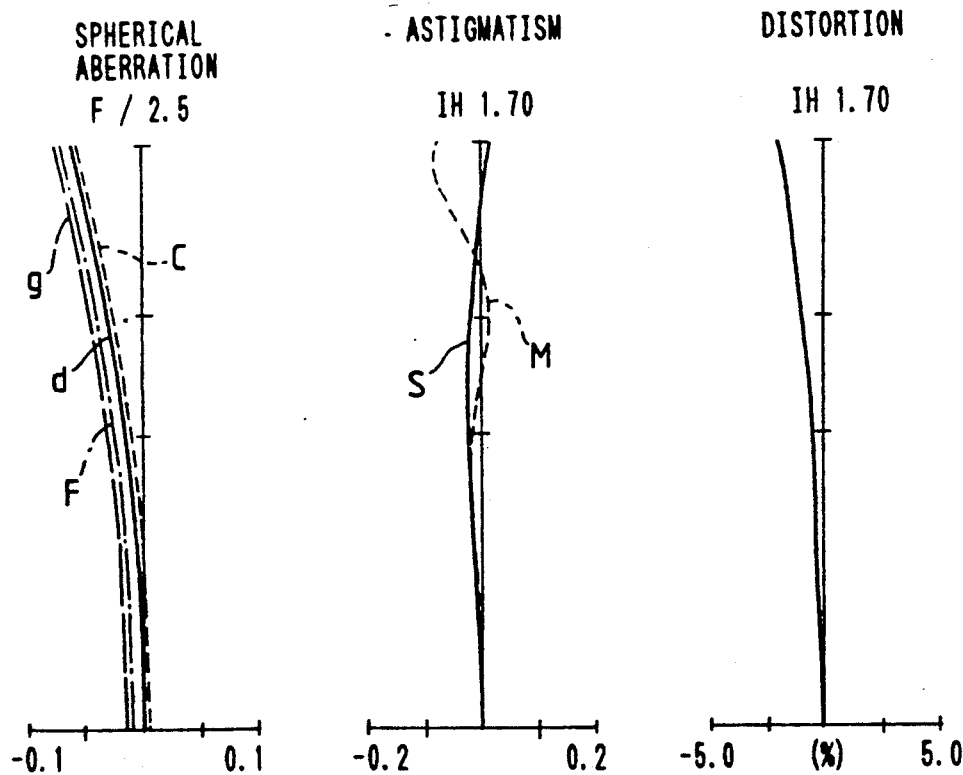
Figure 19:
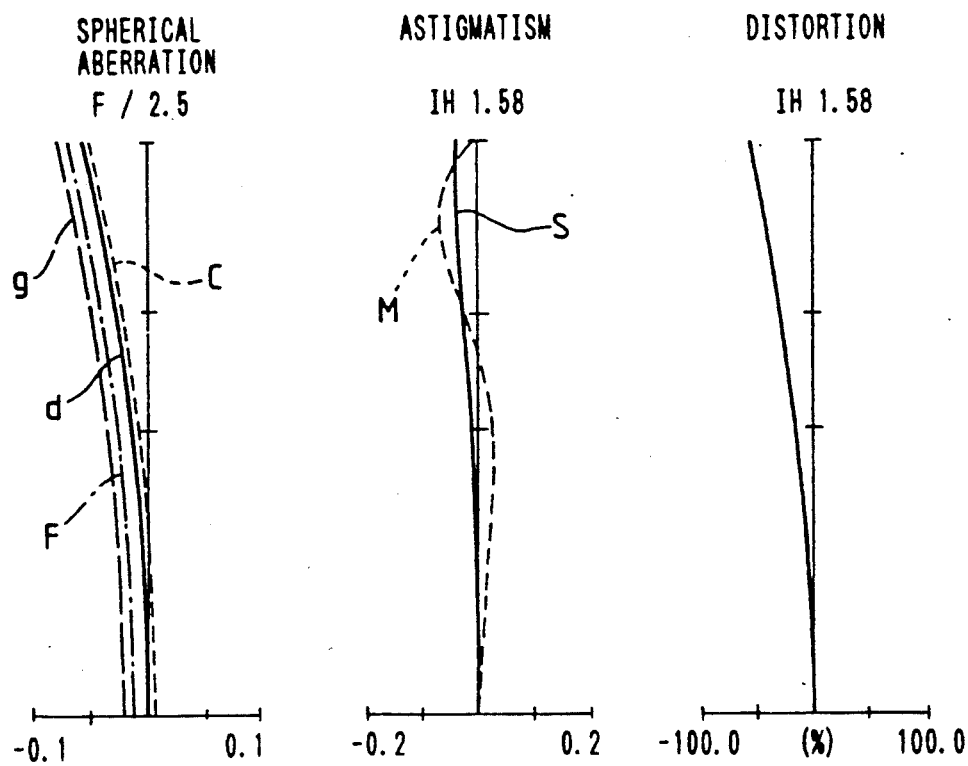
Figure 20:
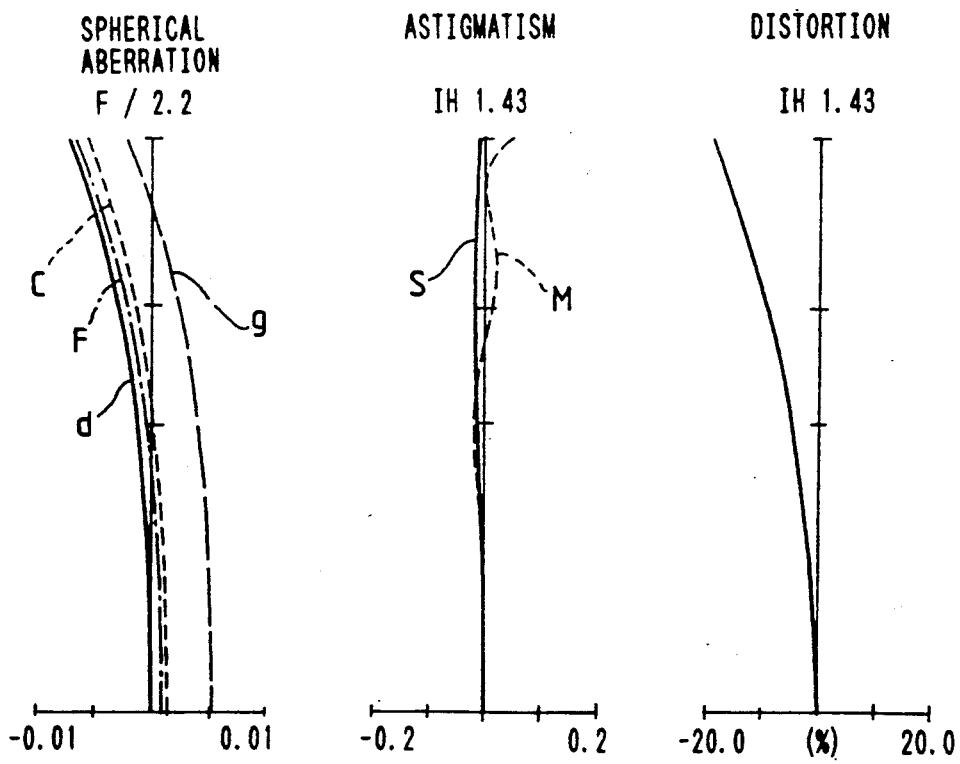

(5) $|\beta_E|$
(6) $|f_1/f|$
(7) $|f_2/f|$
(8) $|h_{am}/r_s|$
(9) $|h_{ac}/I|$
(11) $|f_a|/f$ The above-described Embodiments 1 through 7 have the compositions illustrated in FIG. 7 through FIG. 13 respectively. Each of these Embodiments satisfies the conditions (8) through (12) in addition to the conditions (1) through (7).

Each of the Embodiments 2 through 6 comprises one or two cemented doublets arranged in the vicinity of an aperture stop and having one or two cemented surfaces convex toward the aperture stop. These cemented doublets are adopted mainly for correcting lateral chromatic aberration.

The cemented doublet arranged immediately after the aperture stop in the Embodiments 2, 4, 5 and 6 is designed so as to satisfy the following condition (13):

$$\nu_{p2} - \nu_{n2} > 15 \quad (13)$$

wherein the reference symbols $\nu_{n2}$ and $\nu_{p2}$ represent Abbe's numbers of the negative lens element and the positive lens element which compose the cemented doublet.

Further, the cemented surface of this cemented doublet is designed as a surface convex toward the aperture stop to make the principal ray incident obliquely on the cemented surface at an angle as large as possible.

In each of the Embodiments 2, 3, 5 and 6, a cemented doublet is arranged at a location immediately before the aperture stop. This cemented doublet is designed so as to satisfy the following condition (14):

$$\nu_{n1} - \nu_{p1} > 15 \quad (14)$$

wherein the reference symbols $\nu_{n1}$ and $\nu_{p1}$ represent Abbe's numbers of the positive lens element and the negative lens element which compose the cemented doublet.

Further, the cemented surface of this cemented doublet is designed as a surface convex toward the aperture stop so that the principal ray is incident obliquely on the cemented surface at an angle as large as possible.

In the Embodiment 7, a cemented doublet is arranged at a location which is not immediately after the aperture stop, but with a positive lens component interposed between the aperture stop and the cemented doublet. The cemented surface of this cemented doublet is convex toward the aperture stop. This cemented doublet also has the function for correcting chromatic aberration, and it is desirable that Abbe's numbers of the lens elements composing the cemented doublet are set in the relationship which is similar to that between the lens elements which compose the cemented doublet arranged immediately after the aperture stop in the Embodiments 2, 4, 5 and 6.

In the Embodiment 4, a plane parallel plate rather thick is arranged immediately before the aperture stop for cancelling distortion and lateral chromatic aberration in the objective optical system with the aberrations to be produced by the plane parallel plate. It is desirable that the plane parallel plate to be used for this purpose is made of a material which has a high refractive index and a small Abbe's number.

The Embodiment 2 is an objective optical system having a long back focal length, and suited for use with video scopes and the similar instruments which require spaces for arranging infrared cut filters, quartz filters and so on.

The Embodiment 7, wherein the final lens component is very thick, can be made into an objective optical system suited for use with video scopes by utilizing the thickness of the final lens component as the space for arranging filters, etc.

As is understood from the foregoing detailed description and clear from the preferred embodiments, the objective optical system for endoscopes according to the present invention is compact, has a wide angle, distortion of small absolute value, and aberration curves having nearly natural shapes, aberrations corrected sufficiently for practical use, and consists of lens elements easily manufacturable.

I claim:

1. An objective optical system for endoscopes comprising:

in order from the object side, a first lens component being a negative meniscus lens, an aperture stop, a second lens component being a positive lens component, a third lens component being a positive lens component and a fourth lens component being a positive cemented doublet;

wherein an object side surface of said first lens component and an image side surface of said third lens component are aspherical surfaces.

2. An objective optical system for endoscopes comprising:

in order from the object side, a first lens component being a negative meniscus lens, a second lens component being a cemented doublet, an aperture stop, a third lens component being a positive cemented doublet and a fourth lens component being a positive lens component;

wherein an object side surface of said first lens component and an image side surface of said fourth lens component are aspherical surfaces.

3. An objective optical system for endoscopes comprising:

in order from the object side, a first lens component being a negative meniscus lens, a second lens component being a cemented doublet, an aperture stop, a third lens component being a positive lens component, a fourth lens component being a positive lens component and a fifth lens component being a positive cemented doublet;

wherein an object side surface of said first lens component and an image side surface of said fourth lens component are aspherical surfaces.

4. An objective optical system for endoscopes comprising:
   in order from the object side, a first lens component being a negative meniscus lens, an aperture stop, a second lens component being a positive cemented doublet, a third lens component being a positive lens component and a fourth lens component being a positive cemented doublet;
   wherein an object side surface of said first lens component and an image side surface of said third lens component are aspherical surfaces.

5. An objective lens system for endoscopes comprising:
   in order from the object side, a first lens component being a negative meniscus lens, a second lens component being a cemented doublet, and aperture stop, a third lens component being a positive cemented doublet, a fourth lens component being a positive lens and a fifth lens component being a positive cemented doublet;
   wherein an object side surface of said first lens component and an image side surface of said fourth lens component are aspherical surfaces.

6. An objective optical system for endoscopes comprising:
   in order from the object side, a first lens component being a negative meniscus lens, an aperture stop, a second lens component being a positive lens component, a third lens component being a positive cemented doublet and a fourth lens component being a positive cemented doublet;
   wherein an object side surface of said first lens component and an object side surface of said fourth lens component are aspherical surfaces.

7. An objective optical system for endoscopes according to claim 1, 2, 3, 4, 5 or 6 satisfying a relation of $H(\theta_1) = k \tan(\theta_1/k)$, an angle of incidence of a principal ray on an entrance pupil is designated by $\theta_1$ and a constant having a value within the range defined below is denoted by k, and satisfying the following conditions (5) through (7):

$1.15 \leq k \leq 3$
(5) $|\beta_E| > 2.5$
(6) $|f_1/f| < 3.5$
(7) $|f_2/f| < 2.5$ wherein the reference system $\beta_E$ represents a paraxial pupil magnification of the objective optical system as a whole, the reference symbol f designates focal length of the objective optical system as a whole, the reference symbol $f_1$ denotes focal length of the front lens unit and the reference symbol $f_2$ represents focal length of the rear lens unit.

* * * * *